US007165526B2

(12) United States Patent
Nakayama et al.

(10) Patent No.: US 7,165,526 B2
(45) Date of Patent: Jan. 23, 2007

(54) DIRECT INJECTION ENGINE AND CONTROLLER FOR THE SAME

(75) Inventors: Yoko Nakayama, Hitachi (JP); Yoshihiro Sukegawa, Hitachi (JP); Takuya Shiraishi, Hitachinaka (JP); Yusuke Kihara, Hitachi (JP); Kenji Tsuchita, Hitachiohta (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/206,227

(22) Filed: Aug. 18, 2005

(65) Prior Publication Data

US 2006/0102141 A1    May 18, 2006

(30) Foreign Application Priority Data

Nov. 18, 2004  (JP) ............................. 2004-334956

(51) Int. Cl.
*F02B 3/04* (2006.01)
(52) U.S. Cl. .................. 123/298; 123/305; 123/406.53
(58) Field of Classification Search ................ 123/298, 123/305, 406.44, 406.53, 406.55
See application file for complete search history.

(56) References Cited

U.S. PATENT DOCUMENTS 5,050,551 A * 9/1991 Morikawa .............. 123/406.44
6,647,952 B1 * 11/2003 Idogawa et al. ........ 123/406.55
6,708,668 B1 *  3/2004 Yoshida et al. ............. 123/305

FOREIGN PATENT DOCUMENTS

JP   2000-120440   4/2000
JP   2002-295261   10/2002

* cited by examiner

*Primary Examiner*—Erick Solis
(74) *Attorney, Agent, or Firm*—Crowell & Moring LLP

(57) ABSTRACT

A direct injection engine and a controller for the engine, which can realize super-retard combustion under high backpressure and can minimize an emission amount of HC at the startup. A cavity is formed in a piston such that fuel spray injected from a fuel injection valve is blown into the cavity. An obstacle member, such as a step, is provided in the cavity to decelerate or stop the fuel spray blown into the cavity. A mount position, mount posture, nozzle structure, injection port shape, etc. of the fuel injection valve are set such that the fuel spray injected from the fuel injection valve is made up of a lead fuel spray component directed toward the ignition plug and having a penetration to extend long beyond the ignition plug, and a main fuel spray component directed toward the piston, thereby enabling the super-retard combustion to be performed under high backpressure.

18 Claims, 11 Drawing Sheets

FIG. 4A
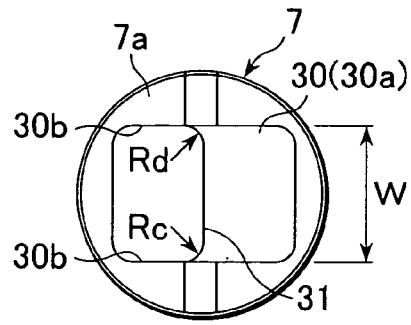
FIG. 4B
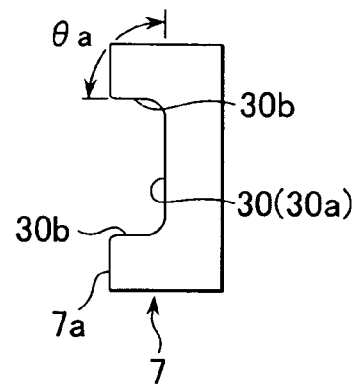
FIG. 4C
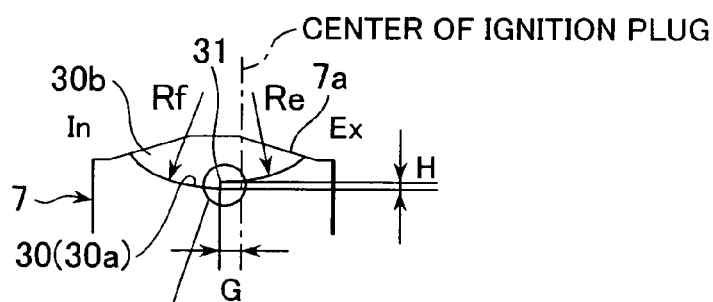
FIG. 4D IN ENLARGED SCALE
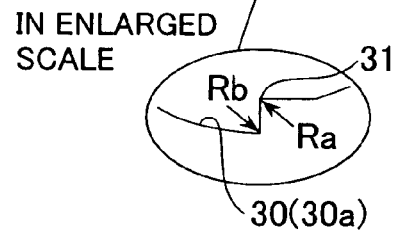
FIG. 4E
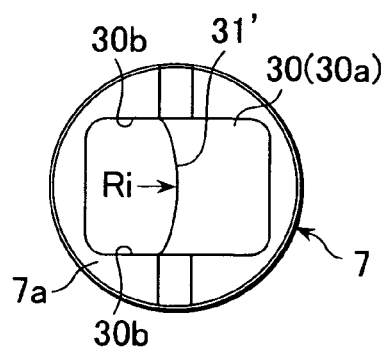

COMPARATIVE EXAMPLE          EMBODIMENT OF INVENTION
FIG. 10A                      FIG. 10B
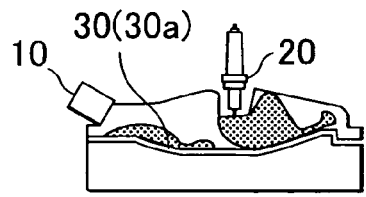 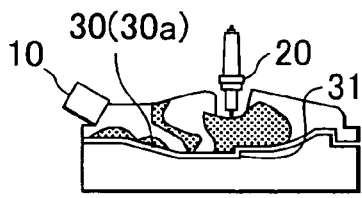
FIG. 10C                      FIG. 10D
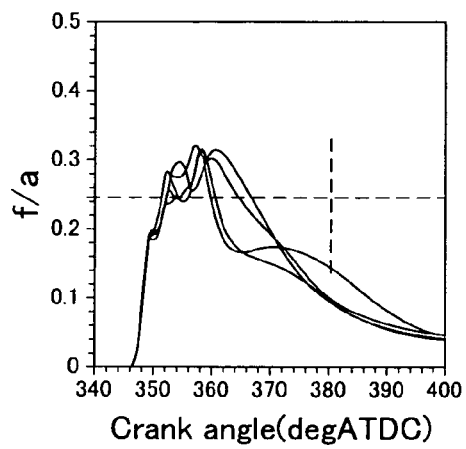 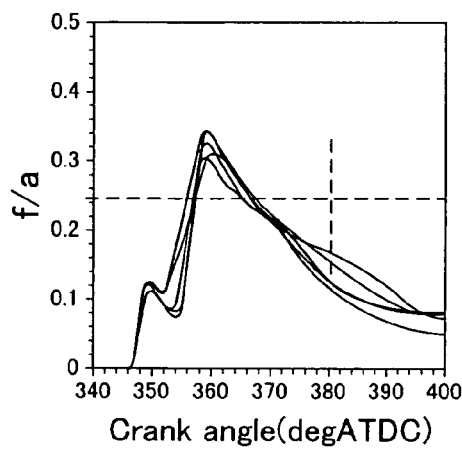
FIG. 11
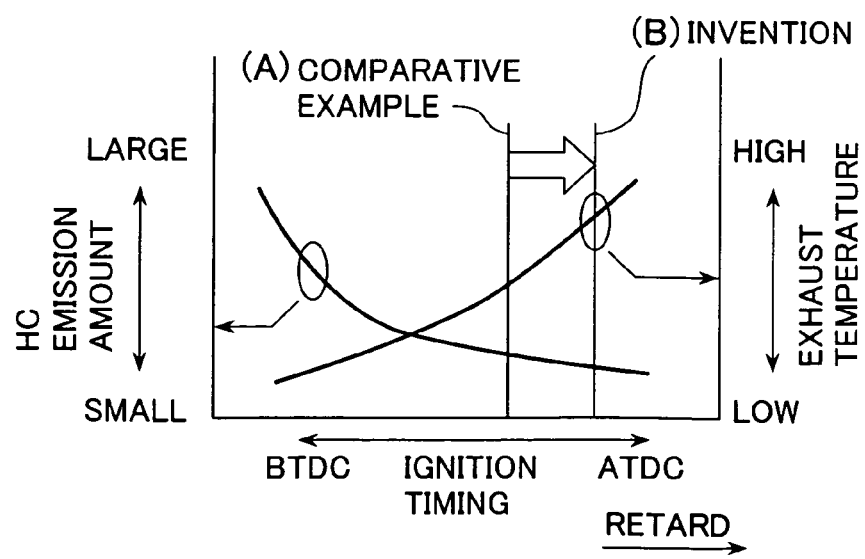

B-B SECTION

C-C SECTION

DIRECT INJECTION ENGINE AND CONTROLLER FOR THE SAME

BACKGROUND OF THE INVENTION

1. Field of the Invention

The present invention relates to a direct injection engine for directly injecting fuel into a combustion chamber and a controller for the engine. More particularly, the present invention relates to a direct injection engine and a controller for the engine, in which the shape of a piston, the shape of fuel spray, etc. are improved to reduce an emission amount of HC at startup of the engine and the ignition timing is largely retarded from that in the ordinary operation to realize super-retard combustion under a high back pressure.

2. Description of the Related Art

In a direct injection engine, many proposals have hitherto been made of methods for improving characteristics (such as the shape and penetration) of fuel spray injected from a fuel injection valve, the shape (of a crown surface) of a piston, flows of air in a combustion chamber, etc., to thereby stratify a gas mixture and improve fuel economy. Recently, those proposals have been progressed from a method of forming a cavity (recess) with a special shape in the piston and stratifying a gas mixture with the presence of the cavity, to a method of utilizing flows of air, etc. to reduce an amount of fuel deposited on a wall surface of the combustion chamber and cut an emission amount of HC, and then to a method of spraying fuel so as to directly reach an ignition plug for an improvement of combustion stability.

As one of those methods, JP-A-2000-120440, for example, proposes a direct injection engine in which two cavities are formed in the crown surface of a piston to have an ω-shaped section. Then, fuel is sprayed to collide against one of the two cavities, while a forward tumble is formed in the other cavity. The fuel spray and the tumble are forced to collide against with each other, thereby promoting mixing of the fuel and air while causing a combustible gas mixture to reach an ignition plug.

Also, JP-A-2002-295261 proposes a direct injection engine in which a step giving a level difference is formed in a bottom wall of a cavity in its portion near the exhaust side, and fuel spray is blown up by the presence of the step to collide against a tumble (vertical vortex) formed in a combustion chamber for stratification around an ignition plug.

Those direct injection engines are advantageous in that, during stratified charge combustion, atomization of the fuel and mixing of the fuel with air are promoted with interaction between the fuel spray and the airflow so that the combustible gas mixture forced to exist in the vicinity of the ignition plug.

SUMMARY OF THE INVENTION

However, the direct injection engines disclosed in the above-mentioned references have the problem that, in a running mode, many of exhausted HC is occupied by HC exhausted during starting operation of the engine. In the starting operation, because of the engine temperature being low, it is required to reduce HC exhausted out of the engine and to quickly activate (heat) an exhaust gas cleaning catalyst disposed in an exhaust passage. Although super-retard combustion in which the exhaust temperature is raised by retarding the ignition timing as far as possible after the compression top dead center is known to be effective in meeting the above-mentioned requirement, such a point is not considered in the direct injection engines disclosed in the above-mentioned references. Further, in order to avoid interference with the tumble, the step formed in the bottom wall of the cavity is located fairly closer to the exhaust side than the position just below the ignition plug.

In the super-retard combustion, it is required, for example, to inject fuel under a high backpressure condition at 20 degrees before the compression top dead center (i.e., 20 BTDC) and to ignite the fuel at 20 degrees after the compression top dead center (i.e., 20 ATDC). Under those conditions, because the piston is positioned near the top dead center and the combustion chamber is in a flat shape, the tumble is collapsed into an assembly of many small vortexes. Also, because the pressure in the combustion chamber is as high as not lower than 1 MPa, the fuel spray is difficult to reach the ignition plug when the fuel is sprayed in the form of a hollow cone from a swirl fuel injection valve that is generally used at the present.

Stated another way, in the direct injection engines disclosed in the above-mentioned references, since the gas mixture is caused to reach the ignition plug with the collision between the tumble and the fuel spray, the gas mixture is not blown up and flows toward the exhaust side under the condition where the tumble is collapsed, as in the super-retard combustion. Therefore, the combustible gas mixture is hard to reach the ignition plug and to remain there, thus resulting in a difficulty in ensuring stable combustion.

With the view of overcoming the problems mentioned above, it is an object of the present invention to provide a direct injection engine and a controller for the engine, which can realize the super-retard combustion under high backpressure without resorting to a flow of air, such as a tumble, and which can minimize an emission amount of HC at the startup.

To achieve the above object, a direct injection engine according to the present invention basically comprises a combustion chamber defined between a cylinder head and a piston; an intake valve and an exhaust valve both disposed in the cylinder head; an ignition plug disposed to face the combustion chamber; and a fuel injection valve disposed at a predetermined angle relative to a horizontal plane in the combustion chamber, which is perpendicular to the direction of upward/downward movement of the piston, and directly injecting fuel into the combustion chamber.

Then, a cavity is formed in a crown surface of the piston such that fuel spray injected from the fuel injection valve is blown into the cavity, and an obstacle member is provided in the cavity to decelerate or stop the fuel spray blown into the cavity, thereby enabling the super-retard combustion to be performed under high backpressure.

In a preferable form, the fuel injection valve is disposed on the intake side of the combustion chamber, and the obstacle member is located in a bottom wall of the cavity at a position just below the ignition plug or in an area nearer to the intake side from the vicinity just below the ignition plug.

Preferably, the obstacle member is constituted by a step formed in the bottom wall of the cavity to have a lower level in an intake-side area and a higher level in an exhaust-side area, or a projection formed on the bottom wall of the cavity to project in a direction to divide the bottom wall into an intake-side area and an exhaust-side area, or a recess formed in the bottom wall of the cavity to indent in a direction to divide the bottom wall into an intake-side area and an exhaust-side area, or a plurality of steps or the likes formed in the bottom wall of the cavity in the intake-side area. In any of those cases, the height or depth of the projection, the recess or each step is preferably set to be within the range of 1–5% in terms of ratio with respect to a cylinder bore.

Also, the obstacle member may be constituted by the bottom wall of the cavity formed such that an intake-side area has coarser surface roughness than an exhaust-side area.

Preferably, a mount position, mount posture, nozzle structure, and an injection port shape of the fuel injection valve are set such that the fuel spray injected from the fuel injection valve is made up of a lead fuel spray component directed toward the ignition plug and having a penetration to extend long beyond the ignition plug, and a main fuel spray component directed toward the piston.

In a preferable form, the fuel injection valve comprises an injection port, a valve seat disposed upstream of the injection port, a valve member capable of moving into contact or away from the valve seat to close or open a fuel passage, a driving unit for driving the valve member, and a swirl applying unit disposed upstream of the injection port and applying a swirl motion to the fuel, the injection port being provided with a step giving a level difference in the direction of an axis of the fuel injection valve to divide an opening of the injection port into two areas.

In another preferable form, the fuel injection valve comprises an injection port, a valve seat disposed upstream of the injection port, a valve member capable of moving into contact or away from the valve seat to close or open a fuel passage, a driving unit for driving the valve member, and a swirl applying unit disposed upstream of the injection port and applying a swirl motion to the fuel, and at least one of a plurality of swirl grooves formed as the swirl applying unit has a height or width larger than the other swirl grooves.

In still another preferable form, the fuel injection valve comprises an injection port, a valve seat disposed upstream of the injection port, a valve member capable of moving into contact or away from the valve seat to close or open a fuel passage, and a driving unit for driving the valve member, the injection port being constituted by a plurality of holes.

According to another aspect, the present invention provides a controller for a direct injection engine comprising a combustion chamber defined between a cylinder head and a piston; an intake valve and an exhaust valve both disposed in the cylinder head; an ignition plug disposed to face the combustion chamber; a fuel injection valve disposed at a predetermined angle relative to a horizontal plane in the combustion chamber, which is perpendicular to the direction of upward/downward movement of the piston, and directly injecting fuel into the combustion chamber; a cavity formed in a crown surface of the piston such that fuel spray injected from the fuel injection valve is blown into the cavity; an obstacle member provided in the cavity and decelerating or stopping the fuel spray blown into the cavity; and a control unit for executing control to retard ignition timing at startup of the engine from the ignition timing in ordinary operation, thereby performing super-retard combustion.

In a preferable form, the control unit sets the ignition timing to be within the range of 0–60 degrees after the compression top dead center and instructs the fuel injection valve to inject the fuel at least once within the range of 5–60 degrees before the ignition timing at the startup of the engine.

Preferably, the control unit detects or estimates at least one of an exhaust temperature, a cooling water temperature and a catalyst temperature, and cancels control for retarding the ignition timing or executes control for reducing a retard amount in accordance with the detected or estimated temperature before temperatures of engine components reach risky levels at which the engine components are damaged.

In that case, the control unit changes fuel injection timing at the same time as canceling the control for retarding the ignition timing or executing the control for reducing the retard amount.

According to the present invention, since formation of a gas mixture around the ignition plug is improved, the super-retard combustion can be performed by largely retarding the ignition timing. It is therefore possible to reduce HC exhausted out of the engine, to raise the exhaust temperature, and to quickly activate the catalyst. As a result, the HC emission amount at the engine startup can be significantly reduced.

BRIEF DESCRIPTION OF THE DRAWINGS

FIGS. 4A–4E are illustrations for explaining one example of a cavity and a step serving as obstacle means (members), which are formed in a piston;

FIGS. 10A–10D are illustrations and graphs for explaining the operation and effect obtained when the step is formed as the obstacle means in the piston (i.e., in the embodiment of the present invention) in comparison with those obtained when no step is formed;

FIG. 11 is a graph for explaining the fact that the super-retard combustion can be realized when the step is formed as the obstacle means in the piston (i.e., in the embodiment of the present invention);

DESCRIPTION OF THE PREFERRED EMBODIMENTS

An embodiment of the present invention will be described below with reference to the drawings.

Figure 1:
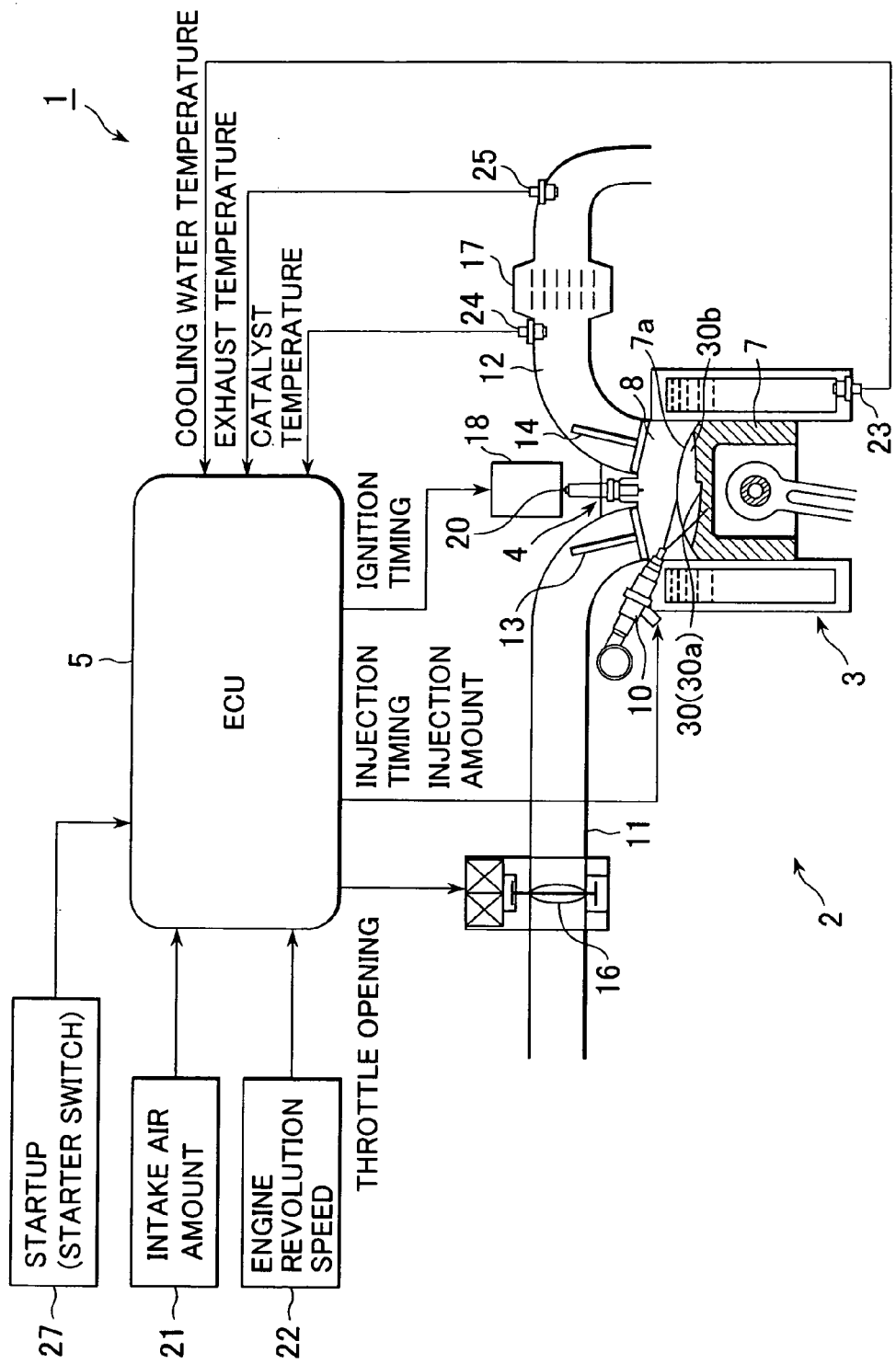
FIG. 1 is a schematic view showing a direct injection engine and a controller for the engine according to one embodiment of the present invention.
Figure 2:
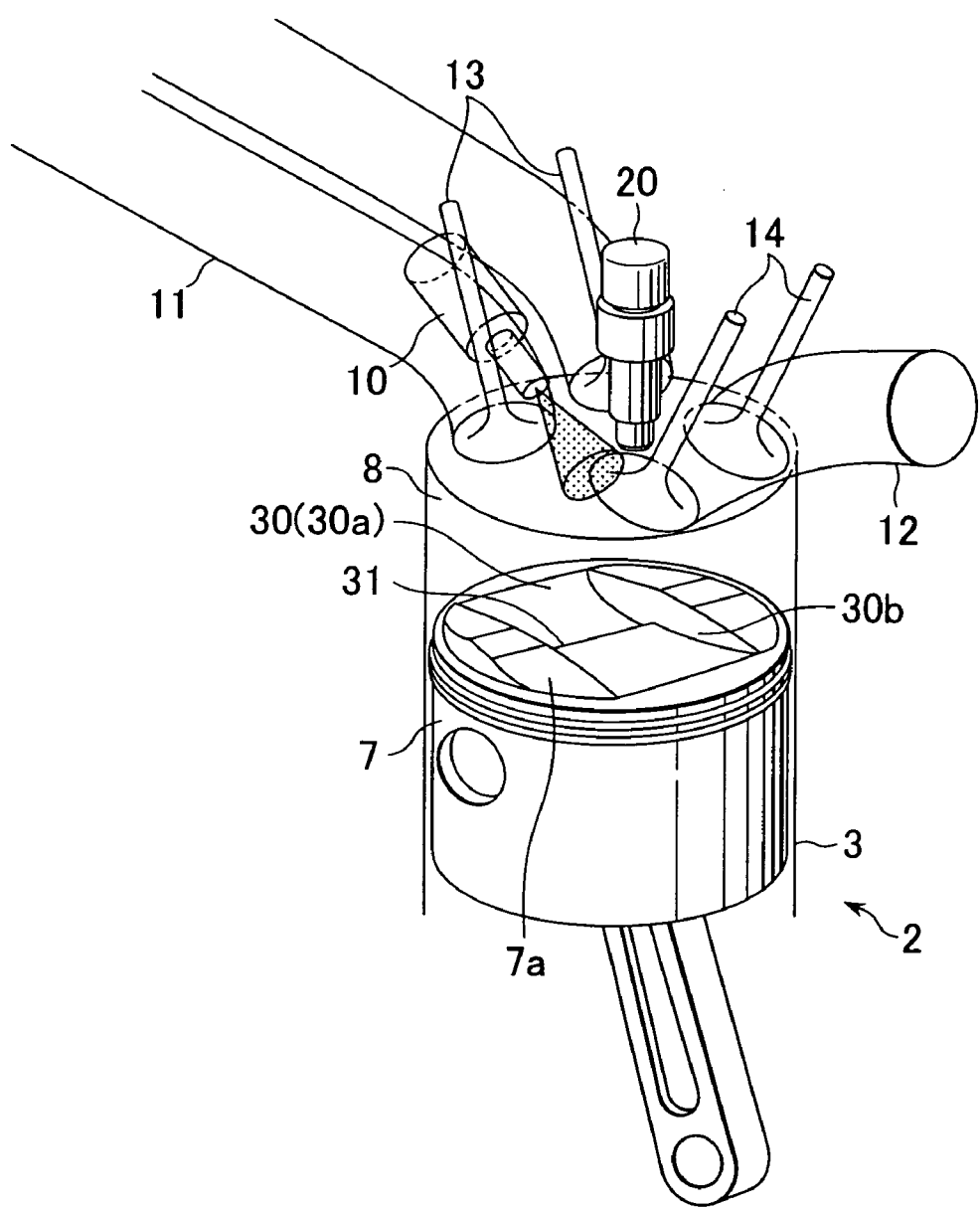
FIG. 2 is a perspective view showing, in a seeing-through way, a principal part of the engine shown in FIG. 1.
Figure 3:
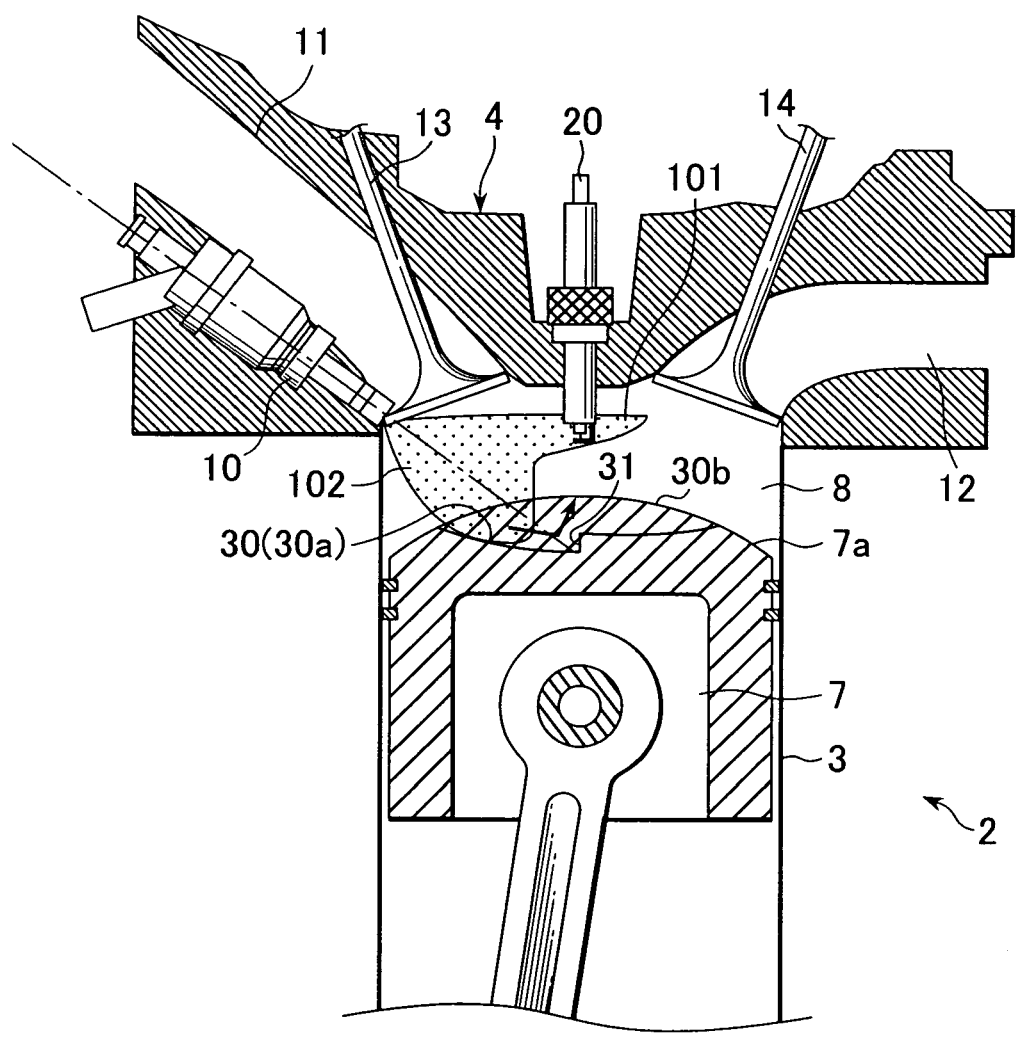
FIG. 3 is a side view, partly broken away, showing the principal part of the engine shown in FIG. 1.

FIG. 1 is a schematic view showing a direct injection engine and a controller for the engine according to one embodiment of the present invention, FIG. 2 is a perspective view showing, in a seeing-through way, a principal part of the engine shown in FIG. 1, and FIG. 3 is a side view, partly broken away, showing the principal part of the engine shown in FIG. 1.

Referring to FIG. 1, an engine 2 is a 4-cylinder in-line direct injection gasoline engine, for example, and comprises a cylinder block 3, a cylinder head 4, and a piston 7 slidably inserted in the cylinder block 3. A combustion chamber 8 is defined between the cylinder head 4 and the piston 7. In a crown surface 7a of the piston 7, there is formed a saucer-shaped cavity 30 that has a bottom wall 30a being arc-shaped in section (with a stepped portion) and has sidewalls 30b, 30b each being in the form of a crescent or half moon as viewed from side. A step 31 giving a level difference and serving as obstacle means (member) is formed in the cavity 30 (as described later in detail).

Two intake ports communicating with an intake passage 11 and two exhaust ports communicating with an exhaust passage 12 are opened to the combustion chamber 8. An intake valve 13 and an exhaust valve 14 are disposed in each intake port and each exhaust port communicating with the intake passage 11 and the exhaust passage 12, respectively, to open and close the corresponding intake port and exhaust port.

On the intake side of the combustion chamber 8 (i.e., on the side nearer to the intake passage 11), a fuel injection valve 10 is disposed at a predetermined angle relative to a horizontal plane in the combustion chamber 8, which is perpendicular to the direction of upward/downward movement of the piston 7, so that gasoline is directly injected as fuel into the combustion chamber 8. The fuel injection valve 10 is located between the two intake ports and is mounted with its distal end (injection port) inclined downward at a predetermined angle relative to the axis of the combustion chamber 8. The fuel is supplied to the fuel injection valve 10 under a predetermined pressure through a fuel supply line provided with a fuel tank, a fuel pump and so on (not shown).

An ignition plug 20 is disposed in a ceiling portion of the combustion chamber 8 in a central area or on the exhaust side (i.e., on the side nearer to the exhaust passage 12) such that an electrode portion of the ignition plug 20 is projected into the combustion chamber 8.

The ignition plug 20 is supplied with electrical energy through an ignition coil 18, and the electrode portion of the ignition plug 20 generates a discharge spark to ignite a gas mixture.

An exhaust gas cleaning catalyst 17 is disposed in the exhaust passage 12. The catalyst 17 is preferably a three-way catalyst, but a NOx catalyst, an HC adsorption and combustion catalyst, or the like is also usable. As an alternative, a plurality of different kinds of catalysts may be used in proper combination. Further, one catalyst having the functions of a plurality of catalysts in a combined way (i.e., a hybrid catalyst) may be used instead.

On the other hand, an electronically controlled throttle valve 16 is disposed in an upstream portion of the intake passage 11. The throttle valve 16 controls the amount of air filled in the combustion chamber 8.

Further, the engine 2 includes an ECU (engine control unit) 5 that constitutes a main part of a controller 1 and controls the ignition timing of the ignition plug 20, the amount and timing of the fuel injected from the fuel injection valve 10 (including the number of fuel injections), the opening of the throttle valve 16, etc. The ECU 5 receives a signal corresponding to an intake air amount from an air-flow sensor 21 disposed in the intake passage 11, a signal representing an engine revolution speed from a crank angle sensor 22 that detects rotations of a crank shaft, a signal outputted from a starter switch 27 for informing the start of starting operation, a signal representing a cooling water temperature from a water temperature sensor 23 disposed on the cylinder block 3, a signal representing a catalyst temperature from a catalyst temperature sensor 24 disposed on the exhaust-entry side of the catalyst 17, a signal representing an exhaust temperature from an exhaust temperature sensor 25 disposed in the exhaust passage 12 downstream of the catalyst 17, and so on. In accordance with those signals, the ECU 5 executes control to realize the super-retard combustion by largely retarding the ignition timing in the starting operation as compared with that in the ordinary operation (as described later in detail).

In this embodiment, as shown in FIGS. 4A–4D, the saucer-shaped cavity 30 having a predetermined width W is formed in the crown surface 7a of the piston 7 such that fuel spray injected from the fuel injection valve 10 is blown into the cavity 30. Then, the step 31 is formed in the bottom wall 30a of the cavity 30 to serve as obstacle means for decelerating or stopping the blown fuel spray. The step 31 is located in the bottom wall 30a of the cavity 30 at a position just below the ignition plug (i.e., the electrode center of the ignition plug) or in an area nearer to the intake side (with an offset G) from the vicinity just below the ignition plug (there area including the exhaust side with respect to the center of the ignition plug electrode) (this arrangement includes, for example, the case where the step 31 is located at a position offset about 1 mm to the exhaust side from the electrode center). Further, the step 31 is formed such that an area of the bottom wall 30a of the cavity 30 nearer to the intake (In) side is low and an area nearer to the exhaust (Ex) side is high at a level difference (height) of H. If the height H of the step 31 is too large, the fuel would stagnate in a recessed corner of the step 31 and cause problems such as generation of smoke, insufficient output in a fully opened state of the throttle valve (i.e., in a high load state), and worsening of fuel economy. For that reason, the height H of the step 31 is preferably set to be within the range of 1–5% in terms of ratio with respect to a cylinder bore (inner diameter). Thus, in this embodiment, the exhaust-side area of the bottom wall 30a of the cavity 30 is higher than the intake-side area thereof by 2 mm that falls within the range of 1–5% in terms of ratio with respect to the cylinder bore. Also, the offset G is preferably set toward the intake side to be within the range of 0–40% in terms of ratio with respect to the cylinder bore. If the offset G is larger beyond that range, it would be difficult to curl up the gas mixture formed from main fuel spray blown into the cavity 30 to such an extent as reaching the ignition plug 20.

Also, the area of the bottom wall 30a nearer to the intake side than the step 31 is a partial cylindrical surface with a radius Rf, and the area of the bottom wall 30a nearer to the exhaust side than the step 31 is a partial cylindrical surface with a radius Re. Further, a wall defining the step 31 is curved in opposite end portions at curvatures Rc, Rd. The curvatures Rc, Rd may be increased to such an extent that the curves in the opposite end portions interfere with each other (see FIG. 4E). Increasing the curvatures leads to the effect of making the main fuel spray more concentrated near the ignition plug. Further, the sidewalls 30b, 30b of the cavity 30 are each preferably formed to have a cross angle θa with respect to the crown surface 7a in the range of 90–60 degrees (in this embodiment, θa is about 90 degrees) for the purpose of providing the function of preventing diffusion of the fuel spray. Upper and lower end portions of the wall defining the step 31 are also curved at respective appropriate curvatures Ra, Rb so that the wall surfaces are interconnected through appropriate curved surfaces. It is desired that the curvatures Ra, Rb be as small as possible from the viewpoint of the function specific to the step 31. To avoid a risk of formation of a hot spot and concentration of stresses, however, the curvatures Ra, Rb are each preferably set to be not smaller than 1 mm.

Looking from above, the step 31 may be formed, for example, in an arc shape (indicated by 31') with a radius Ri, as shown in FIG. 4E, instead of being linear except for the opposite end portions as shown in FIG. 4A.

Figure 5A:
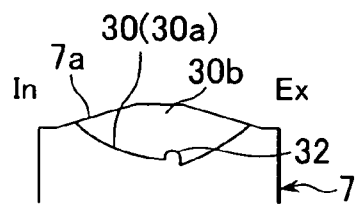
FIGS. 5A–5E are illustrations for explaining other examples of the cavity and the step serving as obstacle means, which are formed in the piston.
Figure 5B:
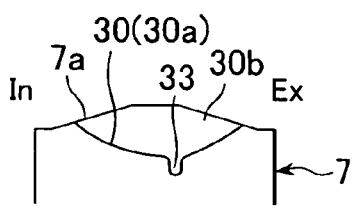
Figure 5C:
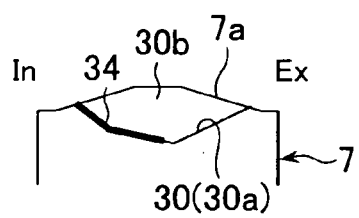
Figure 5D:
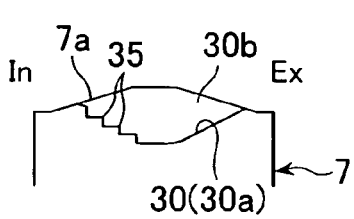
Figure 5E:
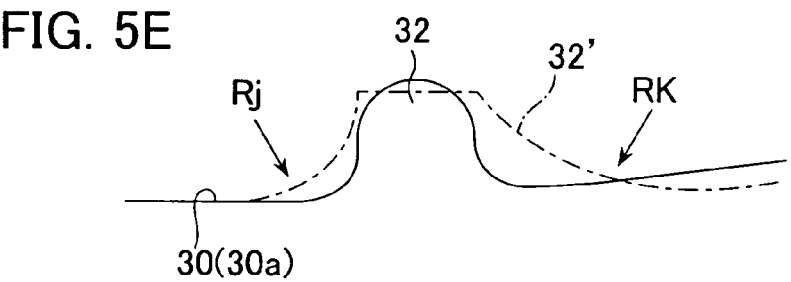

The obstacle means is not limited to the step 31 described above. For example, as shown in FIG. 5A, a projection 32 may be formed to project in a direction to divide the bottom wall 30a of the cavity 30 into two areas nearer to the intake side and the exhaust side. Also, as shown in FIG. 5B, a recess 33 may be formed to indent in a direction to divide the bottom wall 30a of the cavity 30 into two areas nearer to the intake side and the exhaust side. As shown in FIG. 5C, the bottom wall 30a of the cavity 30 may be formed such that the area nearer to the intake side has larger surface roughness (coarser area 34) than the area nearer to the exhaust side. As shown in FIG. 5D, a plurality of projections 35, 35, . . . may be formed in the intake-side area of the bottom wall 30a of the cavity 30. When the projection 32 shown in FIG. 5A has a difficulty in forming curved surfaces at appropriate curvatures in its portions crossing the bottom wall 30a, curved surfaces (indicated by 32') having increased curvatures Rj, Rk may be formed with offsets of the curvature centers, as shown by imaginary lines in FIG. 5E. The height or depth of the projection 32, the recess 33 or each step 35 is preferably set, as with the step 31, to be within the range of 1–5% in terms of ratio with respect to the cylinder bore (inner diameter).

Figure 6A:
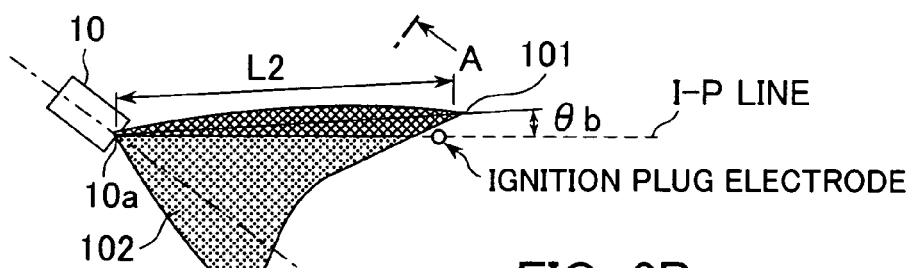
FIG. 6 is an illustration for explaining fuel spray.
Figure 6B:
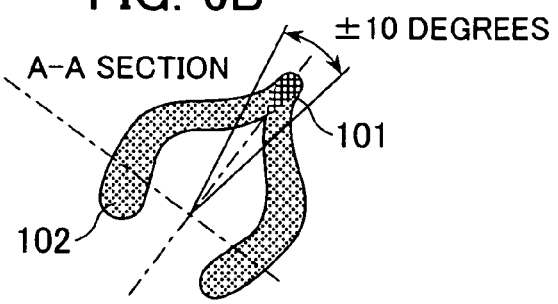

On the other hand, the fuel injection valve 10 used in this embodiment is the so-called L-step fuel injection valve that is constructed by machining a step at a distal end of the known swirl fuel injection valve. Because of being based on the known swirl fuel injection valve, as shown in FIG. 6, fuel spray injected from the fuel injection valve 10 has a hollow conical shape with its portion (lower portion) being lacked. Then, a concentrated region 101 of the fuel spray is present in a position substantially opposed to the lacked portion. The concentrated region 101 is called lead fuel spray, and the other fuel spray region 102 is called main fuel spray. The mount position, mount posture, nozzle structure, shape of an injection port 10a, etc. of the fuel injection valve 10 are set such that the injected fuel spray is made up of the lead fuel spray 101 directed toward the ignition plug 20 and having a penetration (range and penetration power) enough to extend long beyond the ignition plug 20, and the main fuel spray 102 directed toward the piston 7 (primarily the intake side of the cavity 30). More specifically, the fuel injection valve 10 is mounted to the cylinder head 4 (or the cylinder block 3) on the intake side (between the two intake ports) such that the lead fuel spray 101 injected through the injection port 10a does not spread beyond the range of ±10 degrees with respect to the direction toward the ignition plug 20.

Let here assume that an angle at which the longest portion of the lead fuel spray 101 forms relative to a straight line I-P Line connecting the injection port 10a of the fuel injection valve 10 and the electrode of the ignition plug 20 is called an upward end elevation angle θb, and a distance from the injection port 10a to a distal end of the lead fuel spray 101 is called a lead penetration L2.

Looking at a vertical section of pressurization under the backpressure of 1 MPa and the fuel pressure which are given as actual conditions for the super-retard combustion, the lead penetration L2 of the lead fuel spray 101 is required, as described above, to have a length beyond the ignition plug 20. In this embodiment, therefore, the lead penetration L2 is set to about 70% in terms of ratio with respect to the cylinder bore with the upward end elevation angle θb being 0–5 degrees. It is here important that the direction of the lead fuel spray 101 is not changed under a high-temperature and high-backpressure condition and it is held within the range of ±10 degrees with respect to the direction toward the ignition plug 20.

Figure 7:
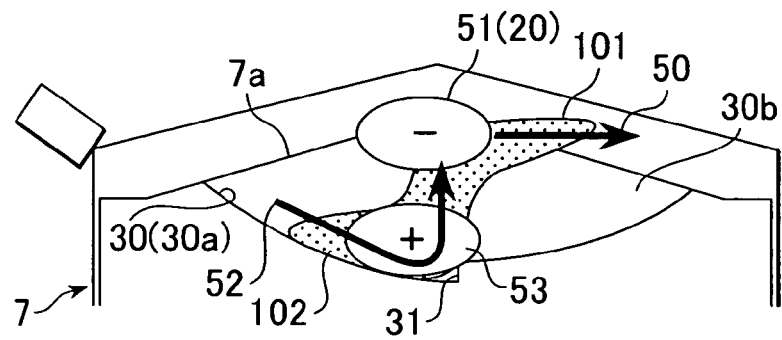
FIG. 7 is an illustration for explaining behaviors of the fuel spray and a gas mixture during the super-retard combustion.

During the super-retard combustion, as shown in FIG. 7, the lead fuel spray 101 passes the vicinity 51 of the ignition plug 20 to form a stream 50, whereupon a negative pressure is produced in the ignition plug vicinity 51. The main fuel spray 102 is blown into the cavity 30 and flows along the bottom wall 10a of the cavity 30. The flow of the main fuel spray 102 is decelerated upon colliding against the step 31 to produce a positive pressure region 53 near the step 31. Due to a differential pressure between the ignition plug vicinity 51 (negative pressure) and the positive pressure region 53, a rising stream 52 is produced, causing a gas mixture containing the main fuel spray 102 to flow toward the ignition plug 20. As a result, the concentration of the gas mixture around the ignition plug 20 is held in a combustible range.

Figure 8:
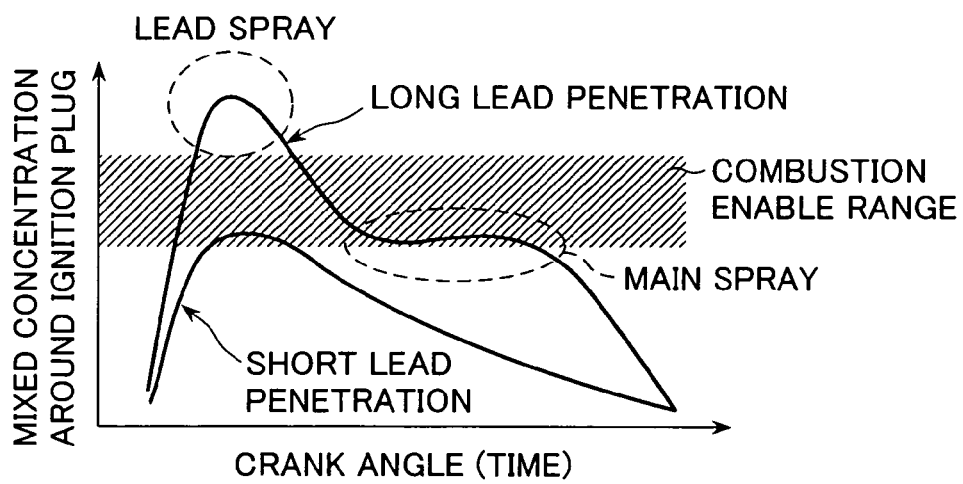
FIG. 8 is an illustration for explaining the difference in operation and effect between lead fuel spray having a short penetration and lead fuel spray having a long penetration.

When the lead penetration is short, the gas mixture does not reach the ignition plug 20 and the concentration of the gas mixture in the ignition plug vicinity 51 changes at a relatively low level with time (namely, a time during which the concentration is held in the combustible range is shortened), as shown in FIG. 8. On the other hand, when the lead penetration is long, the main fuel spray 102 curled up based on the above-mentioned principle reaches the ignition plug 20 after the lead fuel spray 101 has reached the ignition plug 20. Therefore, the concentration of the gas mixture is held high and resides around the ignition plug 20 for a longer time, whereby the combustion is stabilized.

Figure 9:
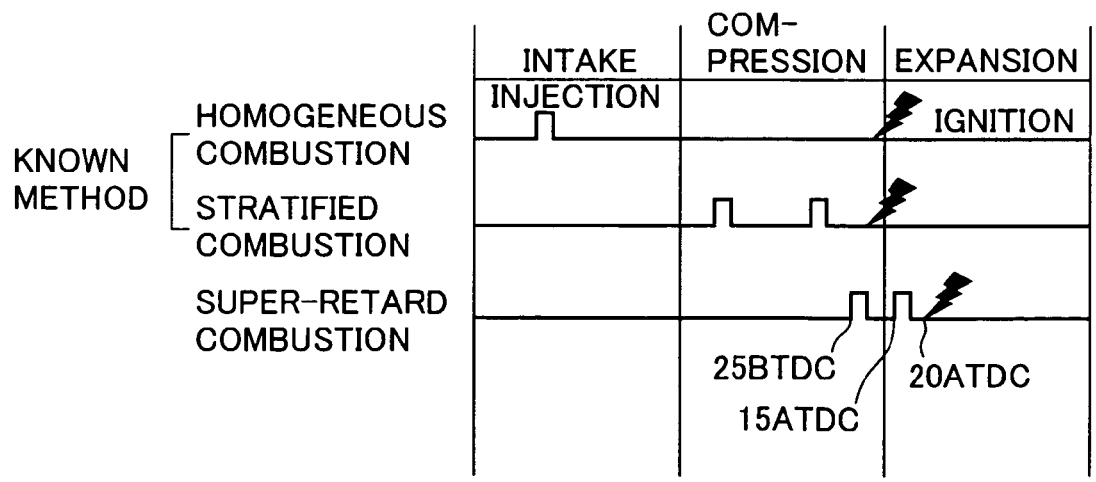
FIG. 9 is a chart showing, by way of example, the fuel injection timing and the ignition timing when the super-retard combustion is performed.

With the construction described above, in this embodiment, the super-retard combustion is performed at the startup (starting operation) of the engine. The super-retard combustion is performed by largely retarding the fuel injection timing and the ignition timing as compared with those during the ordinary homogeneous combustion and the ordinary stratified charge combustion. FIG. 9 shows one example of the fuel injection timing and the ignition timing when the super-retard combustion is performed in this embodiment. The fuel injection timing is set to, e.g., 25 degrees before the compression top dead center (25 BTDC), and the ignition timing is set to, e.g., 20 degrees after the compression top dead center (20 ATDC). Further, the fuel injection is divided into two steps such that a first injection is made at the above-mentioned timing and a second injection is made at 15 degrees after the compression top dead center (15 ATDC) just before the ignition. As a result, after-burning is promoted and the exhaust temperature is increased. In other words, the combustion occurs in such a way that the first injection forms the gas mixture, and the second injection hardly contributes to torque and is used to raise the catalyst temperature.

FIG. 10 shows examples of simulation for formation of the gas mixture. FIGS. 10A and 10C show the case using a normal piston not provided with the step 31 (i.e., a comparative example), while FIGS. 10B and 10D show the case using the piston 7 of this embodiment, which is provided with the step 31. Each of the cases employs the L-step fuel injection valve 10. In the case not forming the step 31 (i.e., in FIGS. 10A and 10C), the gas mixture including the main fuel spray slides over the bottom wall 30a of the cavity 30 and advances to the exhaust side. On the other hand, in the case forming the step 31 as in this embodiment (i.e., in FIGS. 10B and 10D), the gas mixture is concentrated around the ignition plug 20, and the concentration of the gas mixture around the ignition plug 20 at the ignition timing is higher than that in the case not forming the step 31. As a result of calculating fluctuations of the gas mixture over five cycles, it has been proved that the cyclic fluctuations of the gas mixture are also smaller in the case forming the step 31.

Thus, in this embodiment, with the improvement in formation of the gas mixture around the ignition plug 20, as shown in FIG. 11, the ignition timing can be largely retarded in the case (B) of this embodiment using the piston 7 as compared with the case (A) of the comparative example using the normal piston. It is therefore possible to reduce HC exhausted out of the engine, to raise the exhaust temperature, and to quickly activate the catalyst. As a result, the HC emission amount at the engine startup can be significantly reduced.

Figure 12A:
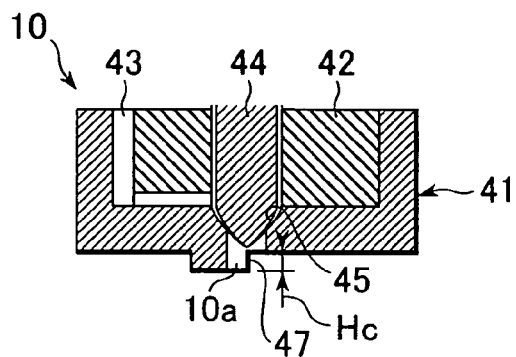
FIGS. 12A and 12B show one example of the structure of a nozzle tip portion of a fuel injection valve.
Figure 12B:
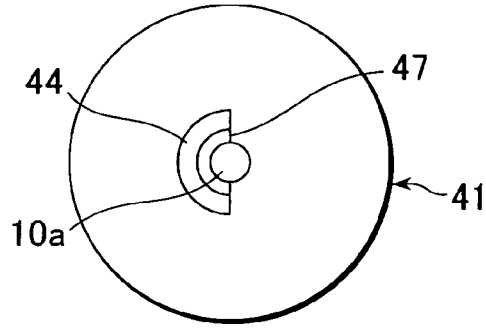

The L-step fuel injection valve 10 is described in more detail below with reference to FIG. 12 that shows the structure of a nozzle tip portion. The fuel injection valve 10 shown in FIG. 12 is constituted as an electromagnetic valve having a valve member driven by a solenoid, and includes a nozzle 41 at the distal end side. The nozzle 41 comprises an injection port 10a, a valve seat 45 disposed upstream of the injection port 10a, and a valve member 44 capable of moving into contact or away from the valve seat 45 to close or open a fuel passage. Above the valve member 44, though not shown, driving means (solenoid) is disposed for moving the valve member 44 into contact or away from the valve seat 45. Around the valve member 44 in the nozzle 41, a swirl applying member 42 having a swirl groove 43 is disposed upstream of the injection port 10a to serve as swirl applying means for applying a swirl motion to the fuel. While the fuel passes through the swirl groove 43 formed in the swirl applying member 42, the fuel is given with a swirling force and is delivered to the outside through the injection port 10a after passing a gap between the valve member 44 and the valve seat 45.

Further, a step 47 (with a height Hc) giving a level difference in the direction of an axis of the fuel injection valve 10 is formed at the injection port 10a so as to divide an opening at a distal end of the injection port 10a. With such a structure including the step 47, the fuel spray is formed as shown in FIG. 6. The step 47 may be in the form having tapered or curved portions. Also, a projected portion of the step 47 is not limited to the form of a 180°-sector oriented, as shown, relative to the injection port 10a, and the projected portion may be formed to span over any range between 1 and 359 degrees so long as the lead fuel spray is directed toward the ignition plug 20.

Figure 13:
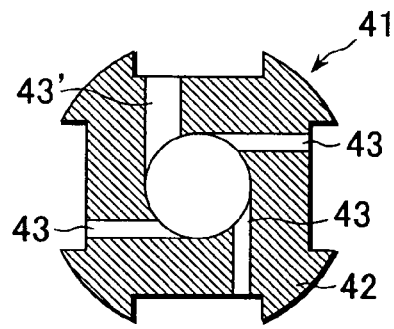
FIG. 13 shows another example of the structure of the nozzle tip portion of the fuel injection valve.
Figure 14:
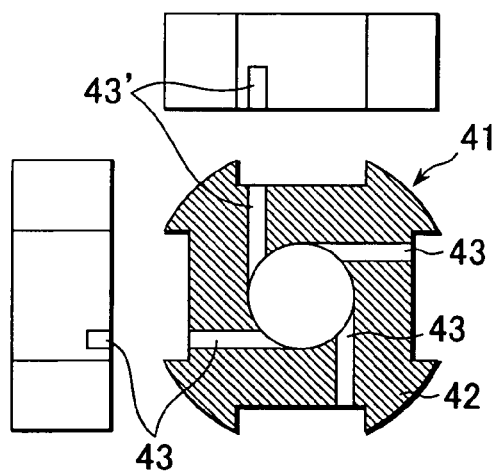
FIG. 14 shows still another example of the structure of the nozzle tip portion of the fuel injection valve.
Figure 15A:
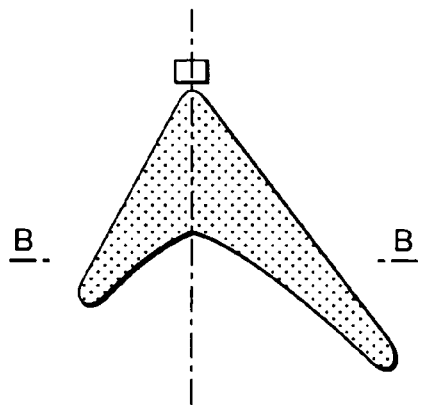
FIGS. 15A and 15B are illustrations for explaining the operation and effect obtained when the width or height of a swirl groove formed in the fuel injection valve is uneven.
Figure 15B:
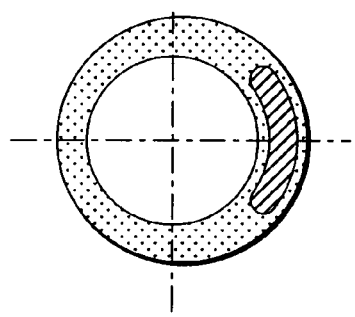

In the fuel injection valve 10, the tip portion of the nozzle 41 may be constructed as shown in FIGS. 13 and 14. The tip portion of the nozzle 41 shown in FIG. 13 has a plurality of swirl grooves 43 (43') formed in the swirl applying member 42 at uneven widths. Also, the tip portion of the nozzle 41 shown in FIG. 14 has a plurality of swirl grooves 43 (43') formed in the swirl applying member 42 at uneven heights. By thus forming the swirl grooves 43 in the swirl applying member 42 at uneven widths or heights, the fuel spray having a hollow conical shape biased one-sidedly can be formed as shown in FIG. 15. In practical use, the fuel injection valve 10 is oriented such that a high-concentration portion of the fuel spray is directed toward the ignition plug 20. Additionally, it is also possible to combine the construction (FIG. 12) having the step 47 and the construction (FIG. 13 or 14) having the swirl grooves 43 formed at uneven widths or heights with each other as required.

Figure 16A:
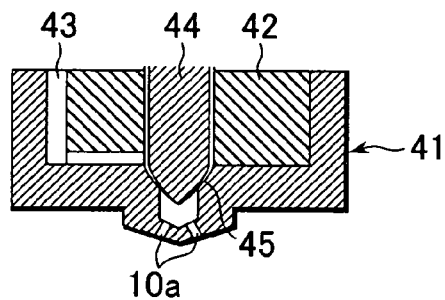
FIGS. 16A and 16B show still another example of the structure of the nozzle tip portion of the fuel injection valve.
Figure 16B:
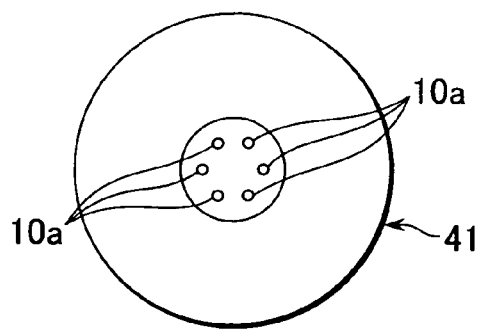
Figure 17A:
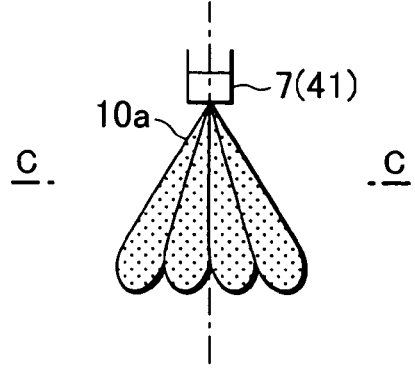
FIGS. 17A, 17B and 17C show still another example of the structure of the nozzle tip portion of the fuel injection valve.
Figure 17B:
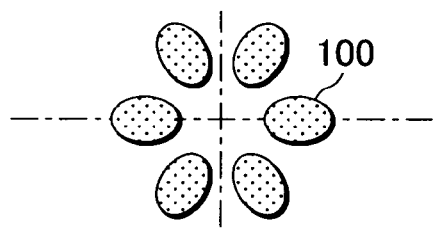
Figure 17C:
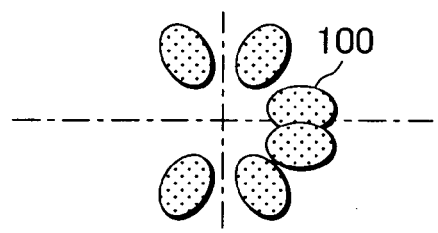

The injection port 10a of the fuel injection valve 10 may be constituted by a plurality of holes as shown in FIG. 16. In this case, for example, the nozzle 41 is constructed with the swirl grooves 43 formed at uneven widths or heights (as described above with reference to FIG. 13 or 14), and one or more of the plurality of holes formed in the injection port 10a through which high-concentration fuel spray is injected is oriented toward the ignition plug 20 such that the high-concentration fuel spray injected through those holes is directed to the ignition plug 20. The other fuel spray than being directed to the ignition plug 20 collides against the step 31 of the piston 7 and is blown up toward the ignition plug 20. Also, when the injection port 10a is constituted by a plurality of holes, the plurality of holes (streams 100 of the fuel spray) may be arranged in a concentric array at circumferential equal intervals as shown in FIGS. 17A and 17B. Instead of such an arrangement, several ones of the plurality of holes (streams 100 of the fuel spray) may be arranged closer to each other as shown in FIG. 17C and oriented toward the ignition plug 20. The latter arrangement is effective in further increasing the combustion stability of the gas mixture. Note that the number of holes is not limited to 6 and can be set to any desired value of not less than 2.

Figure 18:
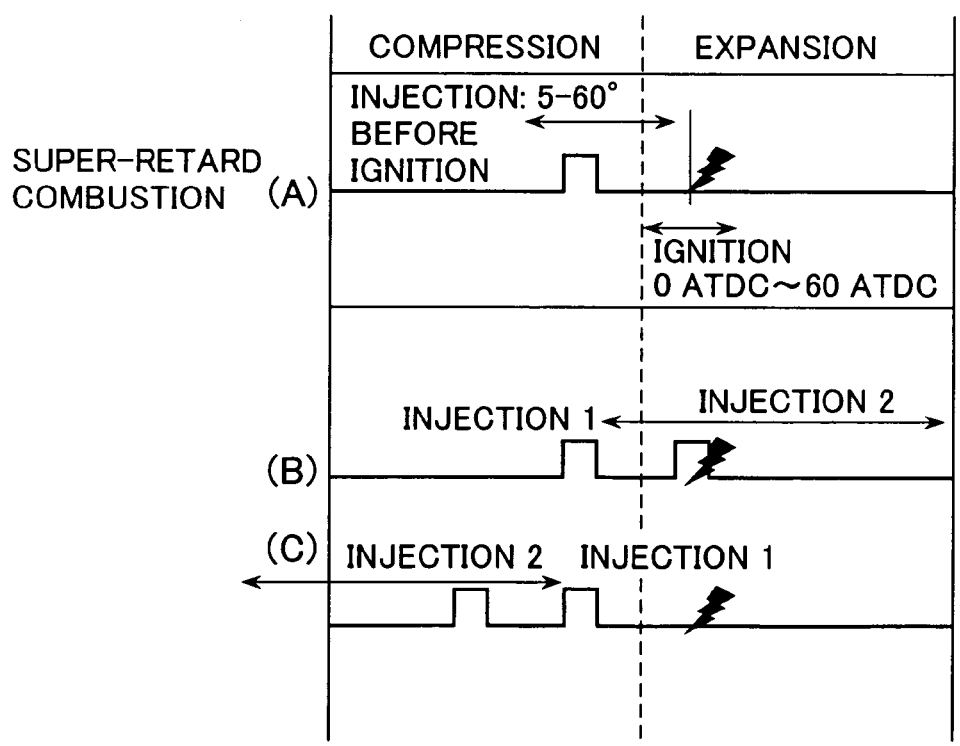
FIG. 18 is a chart for explaining retard of the ignition timing and the fuel injection timing.

Retard of the ignition timing and the fuel injection timing will be described below with reference to FIG. 18.

In this embodiment, the ECU 5 controls the ignition timing of the ignition plug 20, the amount and timing of the fuel injected from the fuel injection valve 10 (including the number of fuel injections), the opening of the throttle valve 16, etc. in accordance with the intake air amount detected by the air-flow sensor 21, the engine revolution speed detected by the crank angle sensor 22, the start timing of the starting operation detected by the starter switch 27, the cooling water temperature detected by the water temperature sensor 23, the catalyst temperature detected by the catalyst temperature sensor 24, the exhaust temperature detected by the exhaust temperature sensor 25. Further, the ECU 5 executes control to realize the super-retard combustion by largely retarding the ignition timing in the starting operation as compared with that in the ordinary operation.

In this embodiment, the ignition timing is set to the range of 0–60 degrees after the compression top dead center (i.e., 0–60 ATDC) in the starting operation (and, if necessary, in the warm-up operation as well). (Note that the ignition timing in the ordinary operation is set to, e.g., about 30 before the compression top dead center.) Correspondingly, the fuel injection is performed at least once in the range of 5–60 degrees before the ignition timing. The fuel injection may be performed plural times without being limited to one. As one preferable example, by performing the second fuel injection immediately before or after the ignition (within ±10 degrees from the ignition timing), after-burning is promoted and the exhaust temperature is increased. In addition to the fuel injection in the range of 5–60 degrees before the ignition timing, the fuel injection may be performed once more during the intake stroke or the compression stroke for the purpose of stabilizing the combustion based on slight stratification.

Figure 19:
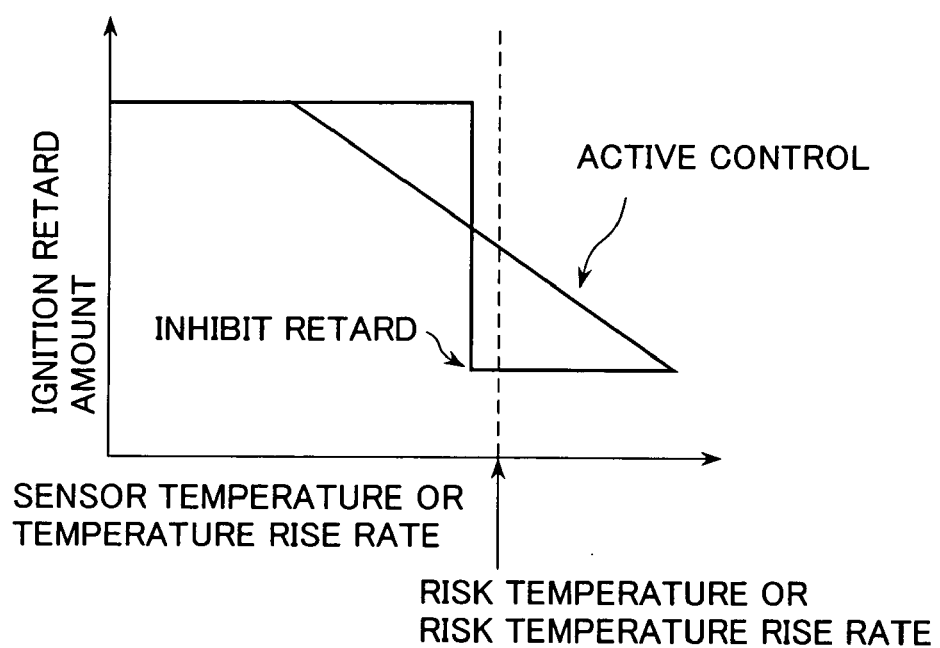
FIG. 19 is a graph for explaining the case where the super-retard combustion is inhibited.

When any of the above-described methods is put into practice, there is a possibility that the exhaust temperature is abruptly increased and the engine components, such as the catalyst 17, are damaged due to heat and thermal deformations. To avoid such a possibility, as shown in FIG. 19, the ECU 5 detects or estimates at least one of the exhaust temperature, the cooling water temperature and the catalyst temperature, and cancels the control for retarding the ignition timing and the fuel injection timing (namely, inhibits the retard) in accordance with the detected or estimated temperature before the engine components are heated to risky temperature levels at which they may be damaged. Alternatively, the ECU 5 executes control for gradually reducing the retard amount (i.e., active control). At the same time as canceling the control for retarding the ignition timing or executing the control for gradually reducing the retard amount, the ECU 5 further changes the fuel injection timing.

When the engine is restarted in a hot condition, the super-retard combustion is performed in a similar manner if the catalyst temperature and the water temperature are not higher than respective predetermined values. The retard amount in that case is computed based on the amount of a temperature rise required at that time.

What is claimed is:

1. A direct injection engine comprising:
   a combustion chamber defined between a cylinder head and a piston;
   an intake valve and an exhaust valve both disposed in said cylinder head;
   an ignition plug disposed to face said combustion chamber;
   a fuel injection valve disposed at a predetermined angle relative to a horizontal plane in said combustion chamber, which is perpendicular to the direction of upward/downward movement of said piston, and directly injecting fuel into said combustion chamber;
   a cavity formed in a crown surface of said piston such that fuel spray injected from said fuel injection valve is blown into said cavity; and
   obstacle means provided in said cavity and decelerating or stopping the fuel spray blown into said cavity, thereby performing super-retard combustion under high back-pressure;
   wherein the height or depth of said obstacle means is set to be within the range of 1–5% in terms of ratio with respect to a cylinder bore.

2. The direct injection engine according to claim 1, wherein said fuel injection valve is disposed on the intake side of said combustion chamber, and said obstacle means is located in a bottom wall of said cavity at a position just below said ignition plug or in an area nearer to the intake side from the vicinity just below said ignition plug.

3. The direct injection engine according to claim 1, wherein said obstacle means is constituted by a step formed in the bottom wall of said cavity to have a lower level in an intake-side area and a higher level in an exhaust-side area.

4. The direct injection engine according to claim 1, wherein said obstacle means is constituted by a projection formed on the bottom wall of said cavity to project in a direction to divide the bottom wall into an intake-side area and an exhaust-side area.

5. The direct injection engine according to claim 1, wherein said obstacle means is constituted by a recess formed in the bottom wall of said cavity to indent in a direction to divide the bottom wall into an intake-side area and an exhaust-side area.

6. The direct injection engine according to claim 1, wherein said obstacle means is constituted by a plurality of steps formed in the bottom wall of said cavity in an intake-side area.

7. The direct injection engine according to claim 1, wherein said obstacle means is constituted by the bottom wall of said cavity formed such that an intake-side area has coarser surface roughness than an exhaust-side area.

8. The direct injection engine according to claim 1, wherein a mount position, mount posture, nozzle structure, and an injection port shape of said fuel injection valve are set such that the fuel spray injected from said fuel injection valve is made up of a lead fuel spray component directed toward said ignition plug and having a penetration to extend long beyond said ignition plug, and a main fuel spray component directed toward said piston.

9. The direct injection engine according to claim 1, wherein said fuel injection valve comprises an injection port, a valve seat disposed upstream of said injection port, a valve member capable of moving into contact or away from said valve seat to close or open a fuel passage, driving means for driving said valve member, and swirl applying means disposed upstream of said injection port and applying a swirl motion to the fuel, said injection port being provided with a step giving a level difference in the direction of an axis of said fuel injection valve to divide an opening of said injection port into two areas.

10. The direct injection engine according to claim 1, wherein said fuel injection valve comprises an injection port, a valve seat disposed upstream of said injection port, a valve member capable of moving into contact or away from said valve seat to close or open a fuel passage, driving means for driving said valve member, and swirl applying means disposed upstream of said injection port and applying a swirl motion to the fuel, and wherein at least one of a plurality of swirl grooves formed as said swirl applying means has a height or width larger than the other swirl grooves.

11. The direct injection engine according to claim 1, wherein said fuel injection valve comprises an injection port, a valve seat disposed upstream of said injection port, a valve member capable of moving into contact or away from said valve seat to close or open a fuel passage, and driving means for driving said valve member, said injection port being constituted by a plurality of holes.

12. A controller for a direct injection engine comprising:
    a combustion chamber defined between a cylinder head and a piston;
    an intake valve and an exhaust valve both disposed in said cylinder head;
    an ignition plug disposed to face said combustion chamber;
    a fuel injection valve disposed at a predetermined angle relative to a horizontal plane in said combustion chamber, which is perpendicular to the direction of upward/downward movement of said piston, and directly injecting fuel into said combustion chamber;
    a cavity formed in a crown surface of said piston such that fuel spray injected from said fuel injection valve is blown into said cavity;
    obstacle means provided in said cavity and decelerating or stopping the fuel spray blown into said cavity; and control means for executing control to retard ignition timing from the ignition timing at startup of said engine in ordinary operation, thereby performing super-retard combustion;

wherein the height or depth of said obstacle means is set to be within the range of 1–5% in terms of ratio with respect to a cylinder bore.

13. The controller for the direct injection engine according to claim 12, wherein said control means sets the ignition timing to be within the range of 0–60 degrees after the compression top dead center and instructs said fuel injection valve to inject the fuel at least once within the range of 5–60 degrees before the ignition timing at the startup of said engine.

14. The controller for the direct injection engine according to claim 12, wherein said control means detects or estimates at least one of an exhaust temperature, a cooling water temperature and a catalyst temperature, and cancels control for retarding the ignition timing or executes control for reducing a retard amount in accordance with the detected or estimated temperature before temperatures of engine components reach risky levels at which the engine components are damaged.

15. The controller for the direct injection engine according to claim 12, wherein said control means detects or estimates at least one of an exhaust temperature, a cooling water temperature and a catalyst temperature, and cancels control for retarding the ignition timing or executes control for reducing a retard amount in accordance with the detected or estimated temperature before temperature rise rates of engine components reaches to risky levels at which said engine components are damaged.

16. The controller for the direct injection engine according to claim 14, wherein said control means changes fuel injection timing at the same time as canceling the control for retarding the ignition timing or executing the control for reducing the retard amount.

17. The controller for the direct injection engine according to claim 15, wherein said control means changes fuel injection timing at the same time as canceling the control for retarding the ignition timing or executing the control for reducing the retard amount.

18. A controller for a direct injection engine comprising:
a combustion chamber defined between a cylinder head and a piston;
an intake valve and an exhaust valve both disposed in said cylinder head;
an ignition plug disposed to face said combustion chamber;
a fuel injection valve disposed at a predetermined angle relative to a horizontal plane in said combustion chamber, which is perpendicular to the direction of upward/downward movement of said piston, and directly injecting fuel into said combustion chamber;
a cavity formed in a crown surface of said piston such that fuel spray injected from said fuel injection valve is blown into said cavity; and
a step or a projection provided in or on a bottom wall of said cavity and decelerating or stopping the fuel spray,
said engine being controlled to retard ignition timing from the ignition timing in ordinary operation at startup of said engine, thereby performing super-retard combustion;
wherein the height or depth of said step or projection is set to be within the range of 1–5% in terms of ratio with respect to a cylinder bore.

* * * * *